(12) United States Patent
Fukudome

(10) Patent No.: US 9,387,722 B2
(45) Date of Patent: Jul. 12, 2016

(54) WHEEL OIL SUPPLY DEVICE AND WHEEL DRIVING DEVICE

(71) Applicant: Hideki Fukudome, Toyota (JP)

(72) Inventor: Hideki Fukudome, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/655,511

(22) PCT Filed: Dec. 27, 2012

(86) PCT No.: PCT/JP2012/083801
§ 371 (c)(1),
(2) Date: Jun. 25, 2015

(87) PCT Pub. No.: WO2014/102949
PCT Pub. Date: Jul. 3, 2014

(65) Prior Publication Data
US 2015/0328925 A1    Nov. 19, 2015

(51) Int. Cl.
| | | |
|---|---|---|
| *B60B 27/00* | (2006.01) | |
| *B60K 7/00* | (2006.01) | |
| *B60K 17/04* | (2006.01) | |
| *F16C 33/66* | (2006.01) | |
| *F16C 19/18* | (2006.01) | |
| *B60K 1/00* | (2006.01) | |

(52) U.S. Cl.
CPC ......... *B60B 27/0047* (2013.01); *B60B 27/0005* (2013.01); *B60B 27/0073* (2013.01); *B60K 7/0007* (2013.01); *B60K 17/046* (2013.01); *F16C 33/6685* (2013.01); *B60B 2900/561* (2013.01); *B60K 2001/006* (2013.01); *B60K 2007/0061* (2013.01); *B60Y 2306/03* (2013.01); *F16C 19/184* (2013.01); *F16C 33/6659* (2013.01); *F16C 2326/02* (2013.01)

(58) Field of Classification Search
CPC ............ B60B 27/0047; B60B 27/0005; B60B 27/0073; B60B 2900/561; B60Y 2306/03; B60K 7/00; B60K 7/007; B60K 17/046; B60K 2007/0061; B60K 2001/006; F16C 33/6659; F16C 33/6685; F16C 19/184
See application file for complete search history.

(56) References Cited

U.S. PATENT DOCUMENTS

| | | | | |
|---|---|---|---|---|
| 3,770,074 | A * | 11/1973 | Sherman ............... | B60K 7/0007 180/339 |
| 8,428,818 | B2 * | 4/2013 | Murahashi ............. | B60B 11/06 180/339 |
| 8,545,106 | B2 * | 10/2013 | Miller ................. | F16C 33/6659 384/473 |

(Continued)

FOREIGN PATENT DOCUMENTS

| | | |
|---|---|---|
| JP | S61-022927 U | 2/1986 |
| JP | H03-43081 B2 | 7/1991 |

(Continued)

*Primary Examiner* — John Walters
*Assistant Examiner* — Brian Swenson
(74) *Attorney, Agent, or Firm* — Oliff PLC

(57) ABSTRACT

A wheel oil supply device assigned to a wheel of a vehicle includes an oil supply pathway for supplying oil to a hub bearing, which rotatably supports a hub connected to a disk wheel of the wheel, an oil seal which is interposed between the hub bearing and a region outside of the hub bearing to seal the oil supplied to the hub bearing through the oil supply pathway, and an oil guiding pathway for guiding the oil which has leaked from the hub bearing to the region outside of the hub bearing through the oil seal, to an oil reservoir which is a predetermined discharge region.

8 Claims, 2 Drawing Sheets

(56) References Cited

U.S. PATENT DOCUMENTS

| | | | |
|---|---|---|---|
| 8,662,277 B2 * | 3/2014 | Schoon | B60T 1/062 188/71.5 |
| 2013/0056289 A1 * | 3/2013 | Shibukawa | B60K 17/046 180/62 |
| 2014/0029882 A1 * | 1/2014 | Palmer | F16C 33/6685 384/473 |

FOREIGN PATENT DOCUMENTS

| | | |
|---|---|---|
| JP | H05-027432 U | 4/1993 |
| JP | H05-169985 A | 7/1993 |
| JP | H10-16582 A | 1/1998 |
| JP | 2007-237834 A | 9/2007 |
| JP | 2009-291002 A | 12/2009 |

* cited by examiner

WHEEL OIL SUPPLY DEVICE AND WHEEL DRIVING DEVICE

TECHNICAL FIELD

The present invention relates to a wheel oil supply device assigned to a wheel.

BACKGROUND ART

An oil supply device which is assigned to a wheel is disclosed in the following patent document 1 (PTL1). This oil supply device is configured so as to supply oil to a hub bearing which rotatably supports a hub connected with a disk wheel of a wheel. According to this configuration, oil serves as a lubricant in the hub bearing. Moreover, in such a configuration, in order to seal the oil supplied to the hub bearing, it is common to use a well-known oil seal. This oil seal achieves a function for sealing the oil supplied to the hub bearing with a seal lip slidingly contacting a sliding surface of the hub bearing.

CITATION LIST

Patent Literature

[PTL1] Japanese Patent Application Laid-Open (kokai) No. 2007-237834

SUMMARY OF INVENTION

In the wheel disclosed in the patent document 1 (PTL1), an external factor (typically, factors, such as a pump effect produced by a hub revolving at high speed and a pressure difference due to a temperature difference between a hub bearing and a region outside of the hub bearing) over a hub bearing can affect an oil leakage from a hub bearing. That is, even if the above-mentioned oil seal is used, there is a limit on sealing oil supplied to a hub bearing completely. Therefore, for designing this kind of oil supply device, on assumption that oil supplied to a hub bearing may leak from an oil seal, it is demanded to configure the device so as to prevents the oil form flowing into an unexpected region where this oil may have a bad influence, typically flowing to brake parts, which can be a factor of a reduction of a braking force, etc.

Then, the present invention has been conceived in light of the above, and it is one objective of the present invention to provide a technique effective in preventing oil supplied to a hub bearing which supports a hub connected with a disk wheel of a wheel from leaking to an unexpected region within a region outside of the hub bearing.

In order to attain the above-mentioned objective, a wheel oil supply device according to the present invention is a device assigned to a wheel of a vehicle, and comprises an oil supply pathway an oil seal and an oil guiding pathway. The oil supply pathway is a route for supplying oil to a hub bearing which rotatably supports a hub connected with a disk wheel of a wheel. Oil for lubrication is supplied to the hub bearing through this oil supply pathway. The oil seal is interposed between the hub bearing and a region outside of the hub bearing, and serves as a sealant which seals the oil supplied to the hub bearing through the oil supply pathway. The oil guiding pathway is a route for guiding the oil which leaked from the hub bearing to the region outside of the hub bearing through the oil seal to a predetermined discharge region. In this case, this oil guiding pathway can be constituted using a space and/or a communicating pathway in a shape of groove or hole, etc., which can store a predetermined quantity of the oil. Thereby, even if it is a case where oil leaks from the hub bearing to a region outside of the hub bearing, since the oil is preferentially discharged to the discharge region through the oil guiding pathway, the oil can be prevented from flowing to an unexpected region where the oil has a bad influence.

It is desirable that a wheel oil supply device according to further embodiment of the present invention comprises a dust seal which is interposed between the hub bearing and the region outside of the hub bearing to seal a dust which flows from the region outside of the hub bearing to the hub bearing. In this case, it is desirable that the oil guiding pathway comprises a space which is comparted within the region outside of the hub bearing by the oil seal and the dust seal and a communicating pathway which makes the space communicate with the discharge region. Thereby, the oil which leaked from the hub bearing to the space is temporarily stored in this space or directly guided to the discharge region through the communicating pathway without being stored in this space. Therefore, the oil which leaked from the hub bearing to the space can be certainly guided to the discharge region. Moreover, since no additional parts for preventing the oil leakage from the hub bearing to the region outside of the hub bearing need to be added, the cost reduction effect of a product can be acquired while simplifying its configuration.

In a wheel oil supply device according to further embodiment of the present invention, it is desirable that the discharge region is disposed in a region other than a braking mechanism which gives a braking force to the wheel. Thereby, the oil which leaked from the hub bearing to the region outside of the hub bearing can be prevented from flowing into the braking mechanism to decline a braking force to be given to the wheel.

In a wheel oil supply device according to further embodiment of the present invention, it is desirable that the discharge region is an oil reservoir which stores oil to be supplied to the hub bearing. Thereby, the oil which leaked from the hub bearing to the region outside of the hub bearing can be reasonably recycled without a loss.

A wheel driving device according to the present invention is a device which drives a wheel of a vehicle, and comprises an electric in-wheel motor, a hub, a hub bearing, a first oil supply mechanism and a second oil supply mechanism. The electric in-wheel motor is an electric motor which is disposed as a driving source of the wheel. The hub is connected with a disk wheel of the wheel and rotated by the driving force of the in-wheel motor. The hub bearing serves a function in rotatably supporting the hub. The first oil supply mechanism serves a function in supplying oil to the in-wheel motor. The second oil supply mechanism serves a function in supplying oil to the hub bearing. This second oil supply mechanism is constituted using the above-mentioned wheel oil supply device.

Here, in a wheel configured to be driven with driving force of an in-wheel motor, in order to secure an installation space for a driving force transmission mechanism, such as a reducer interposed between an in-wheel motor and a hub, the diameter of a hub bearing in a circular shape becomes larger compared with that in a configuration where an in-wheel motor is not mounted. In this case, as a result of the increase in circumferential speed of the hub bearing, an air current from the hub bearing toward a region outside of the hub bearing becomes more likely to be formed, due to a negative pressure (pressure difference between the hub bearing and the region outside of the hub bearing) generated resulting from a fluid suction action by the oil seal. By using the oil guiding pathway of the wheel oil supply device as a measure against this, the pressure difference between the hub bearing and the region outside of the hub bearing can be prevented, and an oil leakage to an unexpected region within the region outside of the hub bearing can be prevented. As a result, an oil supply device suitable for a wheel driving device which drives a wheel with driving force by an in-wheel motor can be achieved.

ADVANTAGEOUS EFFECTS OF INVENTION

As mentioned above, according to the present invention, in a wheel oil supply device which is assigned to a wheel, it has become possible to prevent oil supplied to a hub bearing which rotatably supports a hub connected with a disk wheel of the wheel from leaking to an unexpected region within a region outside of the hub bearing.

DESCRIPTION OF EMBODIMENTS

Figure 1:
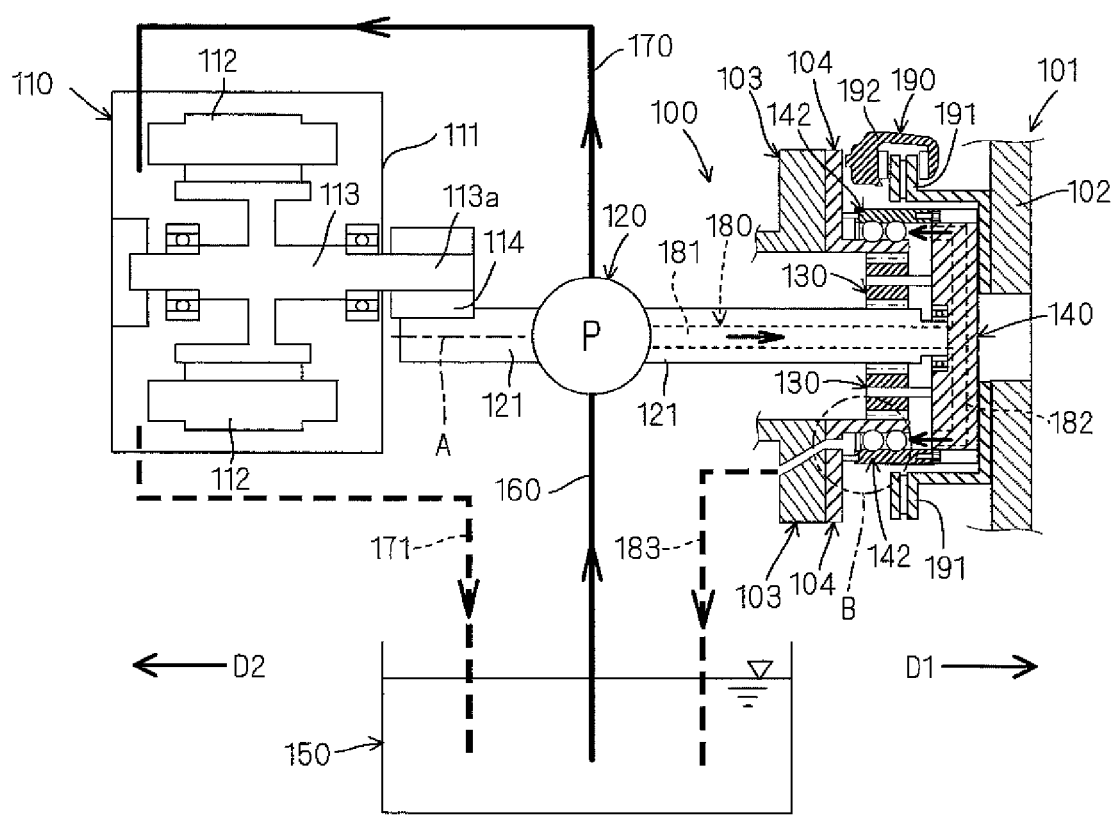
FIG. 1 is an illustration for showing the outline configuration of a wheel oil supply device 100 disposed in a wheel driving mechanism for driving a wheel 101.

Hereafter, embodiments of the present invention will be explained, referring to the drawings.

A wheel driving mechanism (may be referred to as a "wheel driving device") for driving independently the respective of a plurality of rundles (may be referred to as "wheels") 101 disposed in a vehicle is shown in FIG. 1. In this wheel driving mechanism, the wheel 101 is driven using the driving force by an electric motor (may be referred to as an "in-wheel motor") 110 which is a driving source. This motor 110 corresponds to an "in-wheel motor" in the present invention. The wheel 101 is constituted by a tire (not shown) and a disk wheel 102. The disk wheel 102 comprises a rim for holding the tire and a disk connected with a hub 140. The hub 140 is rotated by a driving force of the motor 110 and, thereby, the wheel 101 is driven. In addition, in FIG. 1 and other drawings, the arrow D1 points toward the outside of the vehicle, and the arrow D2 points toward the inside of the vehicle.

In the motor housing 111 of the motor 110, constituents, such as the stator core 112 with a stator coil wound thereon, the rotor 113 and the gear 114, are contained. The rotor 113 extends along its long axis, and the gear 114 is integrally disposed atone end 113a of the rotor 113. Moreover, a permanent magnet is attached to the rotor 113. Therefore, a rotating magnetic field is formed by applying an alternative-current to the stator coil wound around the stator core 112, and the rotor 113 drawn to this rotating magnetic field rotates integrally with the gear 114. Thereby, the driving force by the motor 110 is transmitted to the rotation shaft (driving shaft) 121 engaging with the gear 114, and this rotation shaft 121 rotates around the wheel axis A.

Moreover, the planetary gear (epicyclic gear) 130 is interposed between the rotation shaft 121 and the hub 140. More specifically, the planetary gear 130 is interposed between a sun gear (not shown) disposed on the rotation shaft 121 and a ring gear (not shown) disposed on the inner race 104 fixed to the body side fixing member (typically, a knuckle or a carrier) 103. This planetary gear 130 is intermeshed with the both of the sun gear and the ring gear, and is connected with the hub 140. The planetary gear 130 is revolving around the sun gear when the rotation shaft 121 is rotationally driven, and thereby serves as a reducer which slows down a rotation of the rotation shaft 121 and transmits the same to the hub 140. Thereby, the hub 140 is rotationally driven and, further, a driving force is transmitted to the wheel 101 (a tire and a disk wheel 102) connected with this hub 140. The hub 140 is rotatably supported by the hub bearing 142 configured in a circular shape. The hub 140 and the hub bearing 142 here correspond to a "hub" and a "hub bearing" in the present invention, respectively.

The above-mentioned wheel driving mechanism comprises the disk brake mechanism 190 which gives a braking force to the wheel 101. This disk brake mechanism 190 is arranged lateral to the hub bearing 142 in the radial direction, and comprises the brake disc rotor 191 and the brake caliper 192. The brake disc rotor 191 is fixed to the hub 140 and constituted as a member which rotates integrally with the wheel 101. The brake caliper 192 serves a function in producing a frictional force used as a braking force for the wheel 101, by pressing a brake pad, which is a friction material, to the brake disc rotor 191. This disk brake mechanism 190 corresponds to the "braking mechanism" in the present invention.

Moreover, the above-mentioned wheel driving mechanism comprises the oil supply device 100 which is one embodiment of the "wheel oil supply devices" according to the present invention. This oil supply device 100 is assigned to the wheel 101. That is, it can be said that this oil supply device 100 is one constituent of the wheel driving mechanism for the wheel 101. This oil supply device 100 comprises the oil pump 120, the oil reservoir 150, the intake pathway 160, the first oil supply pathway 170, the first oil discharge pathway 171, the second oil supply pathway 180 and the second oil discharge pathway 183. The oil pump 120 is built in the rotation shaft 121, and is operated by the rotational driving force of this rotation shaft 121. The oil reservoir (may be referred to as a "reservoir tank") 150 serves a function in storing oil as lubricant or coolant (may be referred to as a "lube"). In a state where the oil pump 120 is operating, the oil stored in the oil reservoir 150 is inhaled by the oil pump 120 through the intake pathway 160 and its pressure is raised, and then discharged. This oil reservoir 150 corresponds to the "oil reservoir" in the present invention.

The oil discharged from the oil pump 120 is supplied to the predetermined oil supply destinations of wheel driving mechanism through the respective of the first oil supply pathway 170 and the second oil supply pathway 180. Thereby, at the oil supply destinations, at least one of a lubrication function and a cooling function of oil is achieved. Thereafter, as for the first oil supply pathway 170, the oil is discharged through the first oil discharge pathway 171 to the oil reservoir 150 and thereby a circulation pathway of oil is established between the oil supply destination and the oil reservoir 150. Similarly, as for the second oil supply pathway 180, the oil is discharged through the second oil discharge pathway 183 to the oil reservoir 150 and thereby a circulation pathway of oil is established between the oil supply destination and the oil reservoir 150.

The first oil supply pathway 170 is a route for connecting the oil pump 120 to the space in the motor housing 111 of the electromotor 110, and the oil discharged from the oil pump 120 is supplied to oil supply destinations, such as a stator coil of the motor 110 and the reducer, through this first oil supply pathway 170. In this case, the oil pump 120 and the first oil supply pathway 170 constitute the mechanism ("first oil supply mechanism" in the present invention) for supplying oil to the motor 110. On the other hand, the second oil supply pathway 180 is a route which connects the oil pump 120 and the hub bearing 142, and the oil discharged from the oil pump 120 is supplied to the hub bearing 142 through this second oil supply pathway 180. In this case, the oil pump 120 and the second oil supply pathway 180 constitute the mechanism ("second oil supply mechanism" in the present invention) for supplying oil to the hub bearing 142. Especially, the second oil supply pathway 180 is constituted by the oil flow passages 181 and 182.

The oil flow passage 181 is a flow passage which extends in the direction of the wheel axis (extending direction of the wheel axis A) in the central part of the wheel 101 and through which oil is distributed from the inside of the wheel to the outside of the wheel. This oil flow passage 181 is formed so as to extend in the wheel axis direction within the rotation shaft 121. That is, the oil flow passage 181 is constituted by the rotation shaft 121. The oil flow passage 182 is a flow passage for connecting the oil flow passage 181 and the region of the hub bearing 142. This oil flow passage 182 is formed within the hub 140. That is, the oil flow passage 182 is constituted by the hub 140.

Hereinafter, a concrete configuration of the above-mentioned hub bearing 142 and its periphery will be explained, referring to FIG. 2.

Figure 2:
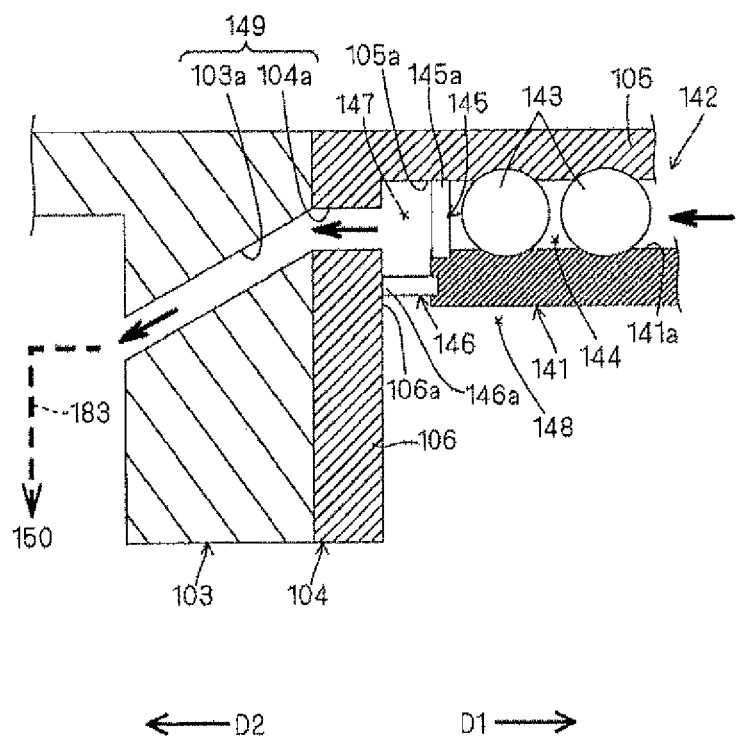
FIG. 2 is an enlarged illustration of the region B of the oil supply device 100 in FIG. 1.

As shown in FIG. 2, the hub bearing 142 comprises the inner race 104 which is a stator-side member, the outer race 141 which is a rotor-side member rotated integrally with the hub 140 in contrast to the inner race 104, and the bearing ball 143 held between the inner race 104 and the outer race 141. In this case, the compartmental region 144 (region inside the hub bearing 142) especially comparted by the outer periphery 105a of the cylindrical part 105 opposing in the radial direction and the inner periphery 141a of the cylindrical outer race 141 becomes a rolling-motion region in which the bearing ball 143 rolls. This hub bearing 142 supports the outer race 141 in a rotatable way around the inner race 104.

In this hub bearing 142, the oil seal 145 and the dust seal 146 both in a circular shape are attached to the outer race 141.

The oil seal 145 is interposed between the hub bearing 142 and the region of the exterior of the hub bearing 142 (region 148 outside of the hub bearing), and its outer periphery is fixed to the outer race 141, and its inner periphery is equipped with the seal lip (oil lip) 145a. This seal lip 145a slidingly contacts the outer periphery 105a of the part 105 opposing in the radial direction of the inner race 104. Therefore, when the outer race 141 rotates on the vehicle axis A around the inner race 104, the outer periphery 105a of the part 105 opposing in the radial direction becomes a sliding surface which slidingly contacts the oil seal lip 145a of the oil seal 145, and a substantial oil seal function (function to seal the oil supplied to the hub bearing 142 through the second oil supply pathway 180) is attained on this sliding surface. This oil seal 145 corresponds to the "oil seal" in the present invention.

The dust seal 146 is interposed between the hub bearing 142 and the region 148 outside of the hub bearing, and its edge on the outer side of the vehicle is fixed to the outer race 141, and its edge on the inner side of the vehicle is equipped with the seal lip (dust lip) 146a. This seal lip 146a slidingly contacts the opposite surface 106a of the part 106 opposing in the axial direction of the inner race 104. Therefore, when the outer race 141 rotates on the axle shaft A around the inner race 104, the opposite surface 106a of the part 106 opposing in the axial direction becomes a sliding surface which slidingly contacts the seal lip 146a of the dust seal 146, and a substantial dust seal function (function to seal the dust which flows into the hub bearing 142) is attained in the sliding surface. This dust seal 146 corresponds to the "dust seal" in the present invention. Moreover, this dust seal 146 comparts the space 147 which is a part of the region 148 outside of the hub bearing, along with the oil seal 145 and the inner race 104.

By the way, an external factor (typically, factors, such as a pump effect produced by the hub 140 revolving at high speed and a pressure difference due to a temperature difference between the hub bearing 142 and the region 148 outside of the hub bearing) over the hub bearing 142 can affect an oil leakage from the hub bearing 142. That is, there is a limit on completely sealing the oil supplied to the hub bearing 142 with the above-mentioned oil seal 145. Moreover, in the wheel 101 which is configured to be driven with driving force of the motor 110, in order to secure an installation space for a driving force transmission mechanism, such as a reducer interposed between the motor 110 and the hub 140, the diameter of the hub bearing 142 in a circular shape becomes larger compared with that in a configuration where the motor 110 is not mounted. In this case, if the outer race 141 rotates at a circumferential speed relatively high to the inner race 104, an air current from the hub bearing 142 toward the region 148 outside of the hub bearing, which is a region other than the space 147, via the space 147 becomes more likely to be formed, due to a negative pressure (pressure difference between the hub bearing 142 and the space 147 or the region 148 outside of the hub bearing) generated according to a fluid suction action by the seal lip 145a when the seal lip 145a of the oil seal 145 slides on sliding surface 105a of the part 105 opposing in the radial direction of the inner race 104. As a result, due to the pressure difference generated between the hub bearing 142 and the region 148 outside of the hub bearing across the seal lip 145a of the oil seal 145, an oil leakage from the hub bearing 142 becomes more likely to occur. Especially, when the oil which has leaked from the hub bearing 142 to the region 148 outside of the hub bearing flows into the brake components such as the disk brake mechanism 190, it is concerned that the braking force of the wheel 101 may decrease.

Then, in this embodiment, the communicating pathway 149 constituted by the passage hole 103a formed within the body side fixing member 103 and the passage 104a formed within the inner race 104 is formed. One end of this communicating pathway 149 communicates with the space 147 and the other end thereof communicates with the second oil discharge pathway 183. Therefore, the space 147 and the communicating pathway 149 serves as an oil guiding pathway which guides the oil which leaked from the hub bearing 142 to the region 148 outside of the hub bearing through the oil seal 145 to a predetermined discharge region (in this embodiment, the oil reservoir 150). In this case, the oil reservoir 150 which is a discharge region is disposed in the region except the disk brake mechanism 190 among the regions in the vehicle or wheel driving mechanism. Here, the space 147 and the communicating pathway 149 correspond to the "space" and "communicating pathway" in the present invention, respectively. Moreover, the second oil discharge pathway 183, in addition to the space 147 and the communicating pathway 149, constitute the "oil guiding pathway" in the present invention.

Thereby, when the oil supplied to the hub bearing 142 leaks thereafter from between the sliding surface 105a of the part 105 opposing in the radial direction of the inner race 104 and the seal lip 145a of the oil seal 145, this oil flows into the communicating pathway 149 via the space 147. As a result, the oil which flew through the communicating pathway 149 is discharged to the oil reservoir 150 through the second oil discharge pathway 183, and the circulation pathway of oil is established between the hub bearing 142 and the oil reservoir 150. Thereby, the oil which leaked from the hub bearing 142 can be reasonably recycled without a loss. Moreover, according to this conformation, since no measure such as addition of another component for preventing the oil leakage from the hub bearing 142 to the region 148 outside a hub bearing is needed, as compared with such measure, the cost reduction effect of a product can be acquired while simplifying its configuration.

Moreover, since the space 147 communicates with the 2nd oil discharge pathway 183 through the communicating pathway 149, the pressure difference generated between the hub bearing 142 and the region 148 outside of the hub bearing across the seal lip 145a of the oil seal 145 due to a negative pressure resulting from a fluid suction action by the seal lip 145a can be prevented from generating. As a result, the oil which leaked from the hub bearing 142 to the space 147 comes to preferentially flow into the communicating pathway 149, the oil can be prevented from flowing into the brake components, such as the disk brake mechanism 190, and an unexpected region where the oil has a bad influence within the region 148 outside of the hub bearing. Especially, by preventing the oil which leaked from the hub bearing 142 from flowing into the disk brake mechanism 190, the braking force of the wheel 101 can be prevented from declining. In this way, an oil supply device 100 suitable for the wheel driving device which drives the wheel 101 with the driving force of the motor 110 can be achieved.

The present invention is not limited only to the above-mentioned typical embodiments, and various applications and modifications can be supposed. For example, the following embodiments which are applications of the above-mentioned embodiments can be also implemented.

Although the oil reservoir 150 was disposed as a discharge region to which the oil which leaked from the hub bearing 142 to the space 147 is discharged in the above-mentioned embodiment, in accordance with the present invention, various regions other than the oil reservoir 150, especially the region excluding the braking mechanism, can be preferably chosen as this discharge region.

Although the route constituted by a combination of the space 147 and the communicating pathway 149 was used as an oil guiding pathway which guides the oil which leaked from the hub bearing 142 to the region 148 outside of the hub bearing to the oil reservoir 150 in the above-mentioned embodiment, in accordance with the present invention, the configuration of an oil guiding pathway is not limited to this, and an oil guiding pathway can be constituted using at least one of a space and a communicating pathway in a shape of groove or hole, for example.

Although the space 147 was comparted using the oil seal 145 and the dust seal 146 in the above-mentioned embodiment, in accordance with the present invention, a region which corresponds to the space 147 can be comparted and formed using at least a member which corresponds to the oil seal 145. In this case, the dust seal 146 can be omitted, if necessary.

Although the oil supply device 100 which was assigned to the wheel driving mechanism in which the motor 110 was the driving source of the wheel 101 was described in the above-mentioned embodiment, the present invention can be applied to an oil supply device which is assigned to a wheel driving mechanism in which all or a portion of the driving source of the wheel is a driving source other than the motor 110 (typically, an internal-combustion engine).

The invention claimed is:
1. A wheel oil supply device, which is assigned to a wheel of a vehicle, comprising:
    an oil supply pathway for supplying oil to a hub bearing, which rotatably supports a hub connected to a disk wheel of said wheel,
    an oil seal which is interposed between said hub bearing and a region outside of the hub bearing to seal the oil supplied to said hub bearing through said oil supply pathway, and
    a dust seal which is interposed between said hub bearing and said region outside of the hub bearing to seal a dust which flows from said region outside of the hub bearing to said hub bearing, and
    an oil guiding pathway which comprises a space that is comparted by said oil seal and said dust seal and a communicating pathway that makes said space communicate with a predetermined discharge region and thereby, when the oil supplied to said hub bearing leaks to said space through said oil seal, guides the oil to said discharge region, and prevents a pressure difference between said hub bearing and said region outside of the hub bearing from generating due to a negative pressure resulting from the rotation of said hub.

2. The wheel oil supply device according to claim 1, wherein:
    said discharge region is disposed in a region other than a braking mechanism which gives a braking force to said wheel.

3. The wheel oil supply device according to claim 2, wherein:
    said discharge region is an oil reservoir which stores oil to be supplied to said hub bearing.

4. A wheel driving device which drives a wheel of a vehicle, comprising:
    an electric in-wheel motor which is disposed as a driving source of said wheel,
    a hub which is connected with a disk wheel of said wheel and rotated by the driving force of said in-wheel motor,
    a hub bearing which rotatably supports said hub,
    a first oil supply mechanism for supplying oil to said in-wheel motor, and
    a second oil supply mechanism for supplying oil to said hub bearing, and
    wherein:
    said second oil supply mechanism is constituted by the wheel oil supply device according to claim 3.

5. A wheel driving device which drives a wheel of a vehicle, comprising:
    an electric in-wheel motor which is disposed as a driving source of said wheel,
    a hub which is connected with a disk wheel of said wheel and rotated by the driving force of said in-wheel motor,
    a hub bearing which rotatably supports said hub,
    a first oil supply mechanism for supplying oil to said in-wheel motor, and
    a second oil supply mechanism for supplying oil to said hub bearing, and
    wherein:
    said second oil supply mechanism is constituted by the wheel oil supply device according to claim 2.

6. The wheel oil supply device according to claim 1, wherein:
    said discharge region is an oil reservoir which stores oil to be supplied to said hub bearing.

7. A wheel driving device which drives a wheel of a vehicle, comprising:
    an electric in-wheel motor which is disposed as a driving source of said wheel,
    a hub which is connected with a disk wheel of said wheel and rotated by the driving force of said in-wheel motor,
    a hub bearing which rotatably supports said hub, a first oil supply mechanism for supplying oil to said in-wheel motor, and a second oil supply mechanism for supplying oil to said hub bearing, and wherein:

said second oil supply mechanism is constituted by the wheel oil supply device according to claim 6.

8. A wheel driving device which drives a wheel of a vehicle, comprising:

an electric in-wheel motor which is disposed as a driving source of said wheel, a hub which is connected with a disk wheel of said wheel and rotated by the driving force of said in-wheel motor, a hub bearing which rotatably supports said hub, a first oil supply mechanism for supplying oil to said in-wheel motor, and a second oil supply mechanism for supplying oil to said hub bearing, and wherein:

said second oil supply mechanism is constituted by the wheel oil supply device according to claim 1.

\* \* \* \* \*